(12) United States Patent
Washio

(10) Patent No.: US 7,603,279 B2
(45) Date of Patent: Oct. 13, 2009

(54) GRAMMAR UPDATE SYSTEM AND METHOD FOR SPEECH RECOGNITION

(75) Inventor: Nobuyuki Washio, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 778 days.

(21) Appl. No.: 10/347,320

(22) Filed: Jan. 21, 2003

(65) Prior Publication Data

US 2003/0195739 A1 Oct. 16, 2003

(30) Foreign Application Priority Data

Apr. 16, 2002 (JP) ............................. 2002-113846

(51) Int. Cl.
*G10L 21/00* (2006.01)
(52) U.S. Cl. .................................... 704/277
(58) Field of Classification Search ................... 704/10, 704/255, 275, 277
See application file for complete search history.

(56) References Cited

U.S. PATENT DOCUMENTS

| 5,699,456 | A | * | 12/1997 | Brown et al. ............... 382/226 |
| 6,144,938 | A | * | 11/2000 | Surace et al. ............... 704/257 |
| 6,163,768 | A | * | 12/2000 | Sherwood et al. ........... 704/235 |
| 6,363,348 | B1 | * | 3/2002 | Besling et al. ............ 704/270.1 |
| 6,374,214 | B1 | * | 4/2002 | Friedland et al. ............ 704/235 |
| 6,424,943 | B1 | * | 7/2002 | Sherwood et al. ........... 704/244 |
| 6,532,444 | B1 | * | 3/2003 | Weber ........................ 704/257 |
| 6,598,018 | B1 | * | 7/2003 | Junqua ....................... 704/251 |
| 6,601,027 | B1 | * | 7/2003 | Wright et al. ............... 704/235 |
| 6,665,640 | B1 | * | 12/2003 | Bennett et al. .............. 704/257 |
| 6,839,669 | B1 | * | 1/2005 | Gould et al. ................ 704/246 |
| 6,985,862 | B2 | * | 1/2006 | Strom et al. ................ 704/255 |
| 7,058,577 | B2 | * | 6/2006 | Surace et al. ............... 704/270 |
| 7,103,533 | B2 | * | 9/2006 | Lewis et al. .................... 704/9 |
| 7,120,582 | B1 | * | 10/2006 | Young et al. ................ 704/255 |
| 7,249,018 | B2 | * | 7/2007 | Ross et al. .................. 704/257 |

FOREIGN PATENT DOCUMENTS

| JP | 9-274495 | 10/1997 |
| JP | 2000-172483 | 6/2000 |
| WO | WO 00/46792 | 8/2000 |

OTHER PUBLICATIONS

Japanese Office Action issued in priority Japanese Application No. 2002-113846, mailed on Sep. 18, 2006.

* cited by examiner

*Primary Examiner*—Michael N Opsasnick
(74) *Attorney, Agent, or Firm*—Staas & Halsey LLP

(57) ABSTRACT

A grammar update method for storing grammar data for speech interaction used for recognizing speech data and newly recognizing the speech data without using the grammar data, includes determining whether or not a new-recognition result in the newly-recognizing operation can be accepted, and in the case where the new-recognition result cannot be accepted, specifying a portion to be added and updated from the stored grammar data, thereby adding and updating the grammar data.

10 Claims, 9 Drawing Sheets

```
<grammar mode="voice" xml:lang="en-US">
  <!-- Command is an action on an object -->
  <!-- e.g. "open a window" -->
  <rule id="command" scope="public">
    <ruleref uri="#action"/> <ruleref uri="#object"/>
  </rule>

<rule id="action">
    <one-of>
      <item> open </item>
      <item> close </item>
      <item> delete </item>
      <item> move </item>
    </one-of>
  </rule>

<rule id="object">
   <count number="optional">
      <one-of> <item> the </item> <item> a </item> </one-of>
    </count>
    <one-of>
      <item> window </item>
      <item> file </item>
      <item> menu </item>
    </one-of>
  </rule>
</grammar>
```

FIG. 5

GRAMMAR UPDATE SYSTEM AND METHOD FOR SPEECH RECOGNITION

BACKGROUND OF THE INVENTION

1. Field of the Invention

The present invention relates to a grammar update system and method for updating grammar data used for enhancing speech recognition precision in an interactive voice response (IVR) system.

2. Description of the Related Art

In recent years, due to the rapid advancement of a computer environment, such as an enhanced speed of a CPU, an IVR system using an ASR (Auto Speech Recognition) such as a voice portal server, which is conventionally considered to have an excessively heavy operation processing load, is being actively adopted in general applications.

In an IVR system adopted in a conventional application, in order to enhance speech recognition precision, speech recognition processing is generally performed often by using grammar in accordance with the state of interaction. More specifically, grammar is one of the factors that influence the enhancement of precision of speech recognition, the pursuit of ease to use for a user, enlargement of a degree of freedom in utterance, and the like.

For example, in the case of using a so-called dictation technique so as to enhance a degree of freedom in user's utterance, it is required to consider phrases that are hardly uttered. This increases an operation processing amount involved in speech recognition and decreases a speech recognition ratio as a whole, which lowers a level of user's satisfaction and aggravates a time for achieving a task and an achievement percentage.

Thus, there is a strong demand for obtaining finite-state automaton grammar having a scale and complexity sufficient for recognizing user's utterance assumed in accordance with the situation of interaction and applying the grammar to an IVR system.

However, it is practically very difficult to create sufficient grammar data. Therefore, actually, various phrases are assumed and organized in a format of grammar data.

Furthermore, in order to collect a large amount of speech data, the following is often performed: a number of subjects are allowed to use the present system or a pseudo system, whereby a number of phrases are extracted and organized as grammar data.

The following is also performed: speech data and the like in an existing speech interaction system are stored as log data, and a system manager creates new grammar with respect to a portion where misrecognition is caused due to the grammar while extracting the misrecognized portion.

In the case of using the above-mentioned methods, a considerable number of processes are required for creating grammar data. In some cases, it is even difficult to obtain grammar data capable of realizing recognition precision consistent with the number of processes.

For example, regarding dialect, it is required to collect a number of subjects that speak dialect in each area or in a particular area, or to obtain a technical person who sufficiently understands dialect. However, this is practically difficult.

Alternatively, there is a remarkable difference between male and female colloquial expressions. Therefore, a male technical person may not appropriately create grammar data in accordance with a female.

SUMMARY OF THE INVENTION

Therefore, with the foregoing in mind, it is an object of the present invention to provide a grammar update system and method capable of updating grammar data to be used at a predetermined timing while detecting an update portion of required grammar data by utilizing the result of speech data recognition without using grammar data.

In order to achieve the above-mentioned object, a grammar update system of the present invention includes: an update original grammar recording part for storing grammar data for speech interaction used for recognizing speech data; a speech newly-recognizing part for newly recognizing the speech data without using the grammar data; a new-recognition result determining part for determining whether or not a new-recognition result in the speech newly-recognizing part is acceptable using the grammar data; and a grammar adding and updating part for, in a case where it is determined that the new-recognition result is unacceptable using the grammar data in the new-recognition result determining part, specifying a portion to be added and updated from the grammar data stored in the update original grammar recording part, and adding the portion to be added and updated to the grammar data so as to update the grammar data.

According to the above configuration, an update portion of grammar data to be required can be detected while speech recognition processing using grammar data and speech recognition processing without using the grammar data are performed in parallel. Therefore, the grammar data to be used can be updated neither excessively nor insufficiently, and recognition precision can be enhanced.

Next, in order to achieve the above-mentioned object, a grammar update system of the present invention includes: a log data recording part for storing at least speech data and a speech recognition result as log data; an update original grammar recording part for storing grammar data for speech interaction used for recognizing the speech data; a log obtaining part for obtaining the speech data stored in the log data recording part; a speech newly-recognizing part for newly recognizing the speech data obtained in the log obtaining part without using the grammar data; a new-recognition result determining part for determining whether or not a new-recognition result in the speech newly-recognizing part is acceptable using the grammar data; and a grammar adding and updating part for, in a case where it is determined that the new-recognition result is unacceptable using the grammar data in the new-recognition result determining part, specifying a portion to be added and updated from the grammar data stored in the update original grammar recording part, and adding the portion to be added and updated to the grammar data so as to update the grammar data.

According to the above configuration, an update portion of grammar to be required can be detected while using log data. Therefore, grammar data can be updated neither excessively nor insufficiently, and recognition precision can be enhanced.

Furthermore, in the above-mentioned grammar update system of the present invention, it is preferable that the grammar adding and updating part is capable of setting restriction matter regarding the update of the grammar data. Because of this, special dialect, the difference between male and female colloquial expressions, and the like can be reflected.

Furthermore, it is preferable that the above-mentioned grammar update system of the present invention includes an update information presenting part for presenting the added and updated grammar data or an update portion in the grammar data; and an update instruction input part for confirming whether or not update processing is performed on a basis of the presented update portion of the grammar data. The reasons for this is that the recognition precision can be enhanced by providing a chance of performing tuning processing by a system manager regarding a recognition result.

Furthermore, the present invention is characterized by a recording medium storing software for executing the function of the above-mentioned grammar update system as the processes of a computer. More specifically, the present invention is characterized by a recording medium storing computer-executable software for realizing a grammar update method and processes thereof. The method includes the operations of: storing grammar data for speech interaction used for recognizing speech data; newly recognizing the speech data without using the grammar data; determining whether or not a new-recognition result in the newly-recognizing operation is acceptable using the grammar data; and in a case where it is determined that the new-recognition result is unacceptable using the grammar data in the determining operation, specifying a portion to be added and updated from the stored grammar data, and adding the portion to be added and updated to the grammar data so as to update the grammar data.

According to the above configuration, by loading the program onto a computer for execution, a grammar update system can be realized, in which an update portion of grammar data to be required can be detected while speech recognition processing using grammar data and speech recognition processing without using the grammar data are performed in parallel; therefore, the grammar data to be used can be updated neither excessively nor insufficiently, and recognition precision can be enhanced.

Furthermore, the present invention is characterized by a recording medium storing software for executing the function of the above-mentioned grammar update system as the processes of a computer. More specifically, the present invention is characterized by a recording medium storing computer-executable software for realizing a grammar update method and processes thereof. The method includes the operations of: storing at least speech data and speech recognition result as log data, storing grammar data for speech interaction used for recognizing the speech data, and obtaining the stored speech data; newly recognizing the obtained speech data without using the grammar data; determining whether or not a new-recognition result in the newly-recognizing process is acceptable using the grammar data; and in a case where it is determined that the new-recognition result is unacceptable using the grammar data in the determining process, specifying a portion to be added and updated from the stored grammar data, and adding the portion to be added and updated to the grammar data so as to update the grammar data.

According to the above configuration, by loading the program onto a computer for execution, a grammar update system can be realized, in which an update portion of grammar data to be required can be detected while using log data; therefore, the grammar data to be used can be updated neither excessively nor insufficiently, and recognition precision can be enhanced.

These and other advantages of the present invention will become apparent to those skilled in the art upon reading and understanding the following detailed description with reference to the accompanying figures.

BRIEF DESCRIPTION OF THE DRAWINGS

FIG. 5 is a diagram illustrating grammar data in the grammar update system of the embodiment according to the present invention.

DESCRIPTION OF THE PREFERRED EMBODIMENTS

Hereinafter, a grammar update system of an embodiment according to the present invention will be described with reference to the drawings.

Figure 1:
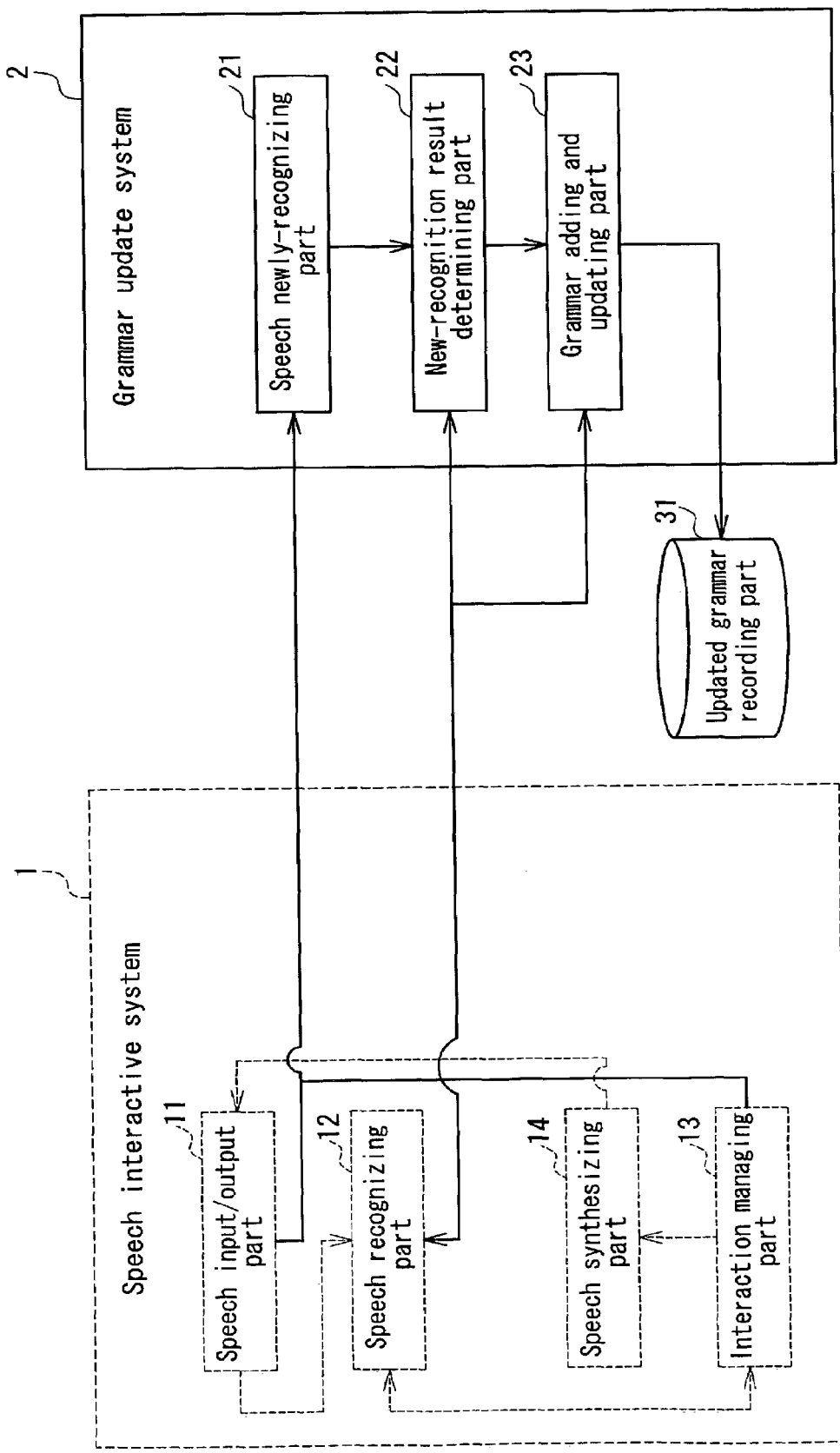
FIG. 1 is a diagram showing a configuration of a grammar update system of an embodiment according to the present invention.

FIG. 1 is a diagram showing a configuration of the grammar update system of the embodiment according to the present invention. In the present embodiment, an update portion of grammar data is detected while recognition processing of speech data using grammar data and recognition processing of speech data without using grammar data are performed in parallel.

In FIG. 1, a generally used IVR system 1 is composed of a speech input/output part 11 for basically inputting speech data and outputting response speech data, a speech recognizing part 12 for recognizing speech data, an interaction managing part 13 for determining a response based on the recognition result, and a speech synthesizing part 14 for synthesizing response speech data to be output. The speech recognizing part 12 uses grammar data stored in an update original grammar recording part 15 so as to enhance recognition precision.

A grammar update system 2 of the present embodiment includes a speech newly-recognizing part 21 for obtaining speech data and the like in the IVR system 1, and recognizing the speech data without using the grammar data stored in the update original grammar recording part 15, a new-recognition result determining part 22 for determining whether or not the new-recognition result is acceptable using the grammar data stored in the update original grammar recording part 15, and a grammar adding and updating part 23 for specifying an update portion and adding it to the grammar data so as to update the data.

Herein, the present embodiment is predicated on the fact that the recognition precision of the speech recognition in the speech newly-recognizing part 21 is higher than that in the speech recognizing part 12. More specifically, the speech newly-recognizing part 21 adopts a recognition method that places weight on the performance rather than the recognition time, using, for example, a large vocabulary dictation system or the like having a sufficient number of acceptable sentences and sufficient vocabulary. The recognition method in the speech newly-recognizing part 21 is not particularly limited thereto, and any method with sufficient recognition precision may be used.

Furthermore, the new-recognition result determining part 22 determines whether or not the new-recognition result in the speech newly-recognizing part 21 can be accepted based on the grammar data stored in the update original grammar recording part 15.

In the case where it is determined that the new-recognition result cannot be accepted based on the grammar data, the grammar adding and updating part 23 specifies such an unaccepted portion as an update portion, and adds the update portion to the, grammar data stored in the update original grammar recording part 15 so as to update the data, and outputs the updated grammar data to an updated grammar recording part 31.

Figure 2:
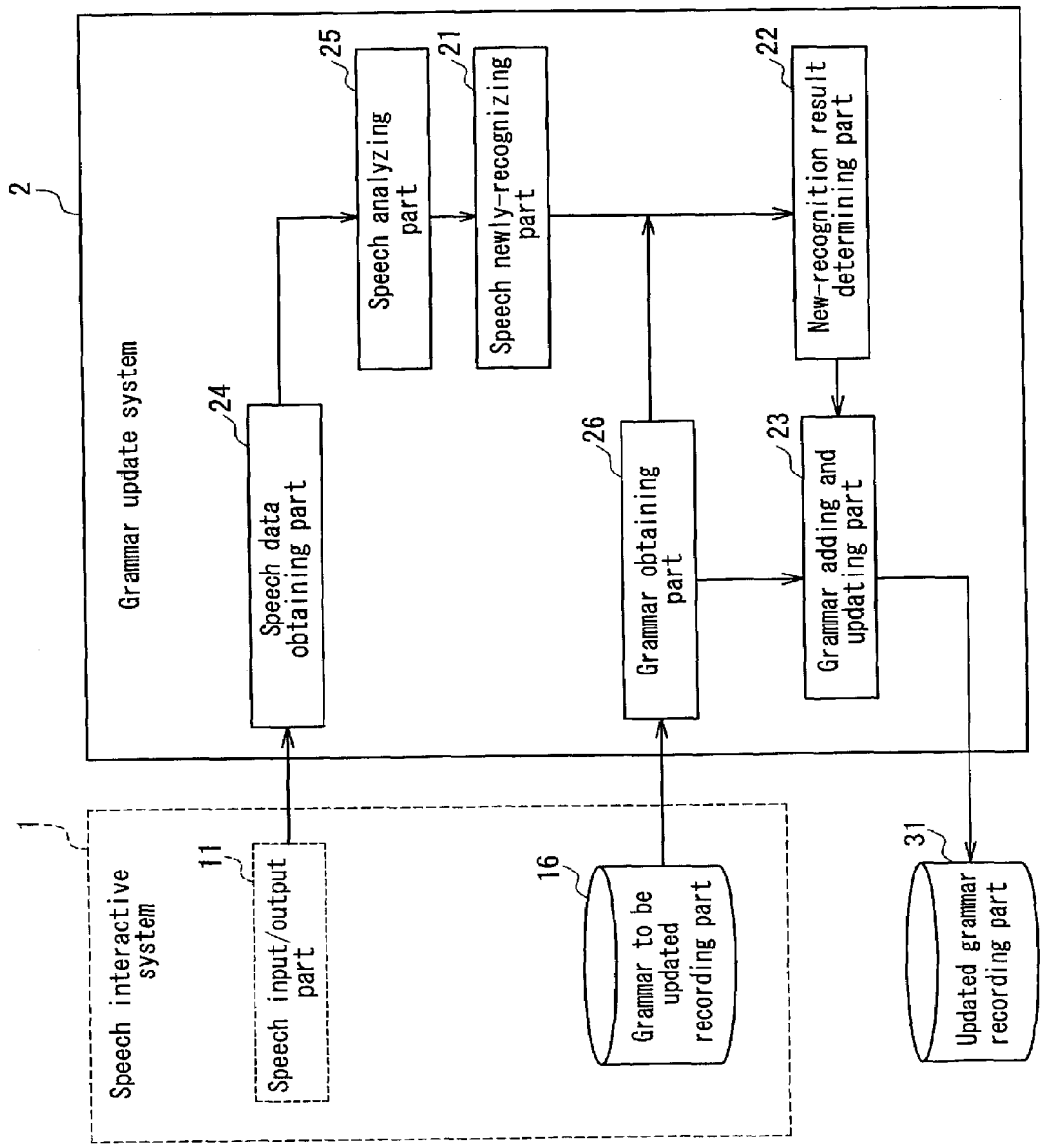
FIG. 2 is a diagram illustrating a configuration of a grammar update system of an example according to the present invention.

More specifically, the following application is considered. FIG. 2 is a diagram illustrating the configuration of a grammar update system of an example according to the present invention. In FIG. 2, the case will be described where a grammar being used is updated in real time using a speech log, an interaction state log, and a recognition result log in the IVR system 1.

In FIG. 2, the IVR system 1 includes a speech input/output part 11 for inputting/outputting speech data to be subjected to speech recognition, and a grammar to be updated recording part 16 for storing grammar to be updated.

First, a speech data obtaining part 24 obtains speech data and gives it to the speech newly-recognizing part 21 via a speech analyzing part 25. The speech analyzing part 25 converts the obtained speech data to a feature value suitable for speech recognition by acoustic analysis processing such as FFT, and gives the feature value to the speech newly-recognizing part 21.

The speech newly-recognizing part 21 recognizes the obtained speech data without using the grammar data, and gives the new-recognition result to the new-recognition result determining part 22.

The new-recognition result determining part 22 obtains the grammar data recorded in the grammar to be updated recording part 16 in a grammar obtaining part 26, and determines whether or not the new-recognition result in the speech newly-recognizing part 21 can be accepted, by using the grammar data. Then, in the case where the new-recognition result can be accepted, it is determined that the grammar data of the new-recognition result has already been contained in the grammar data recorded in the grammar to be updated recording part 16. Therefore, an instruction signal indicating that it is unnecessary to update the grammar data is sent to the grammar adding and updating part 23.

In the case where the new-recognition result cannot be accepted, the new-recognition result in the speech newly-recognizing part 21 and an instruction signal indicating that the grammar data should be updated are sent to the grammar adding and updating part 23.

Only upon receiving the instruction signal for updating the grammar data, the grammar adding and updating part 23 matches the grammar data obtained in the grammar obtaining part 26 with the new-recognition result in the speech newly-recognizing part 21, and determines an unmatched portion as an update portion of the grammar data. Then, the grammar adding and updating part 23 complements the grammar data with the update portion so as to update the grammar data, thereby outputting the updated grammar data to the updated grammar recording part 31.

In the present embodiment, the following is also considered: a grammar portion to be updated is extracted based on log data containing speech data stored in a log data recording part of the generally used IVR system 1, so that tuning of the grammar data can be executed at any time.

Figure 3:
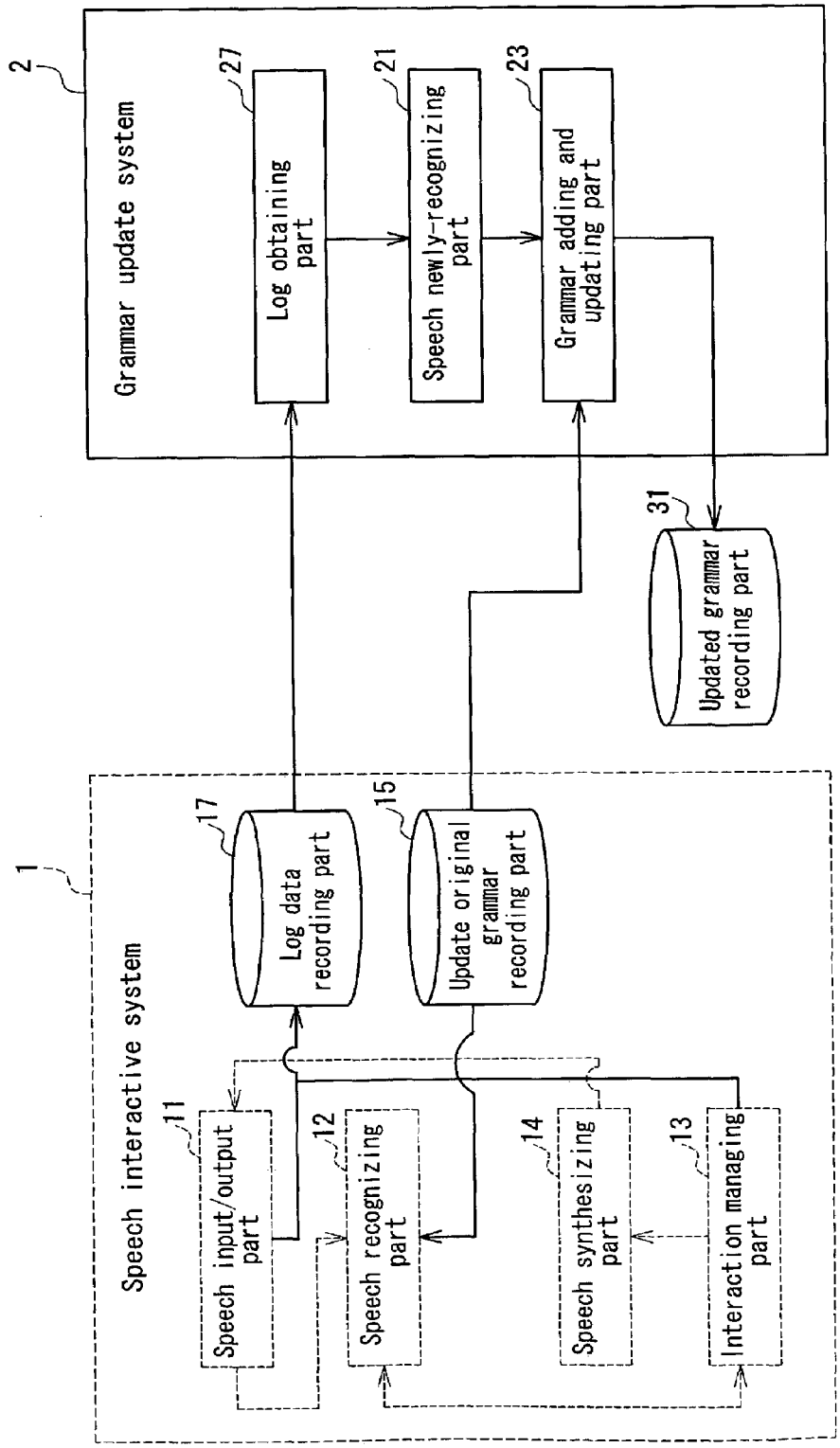
FIG. 3 is a diagram showing a configuration of a grammar update system of the embodiment according to the present invention.

In this case, as shown in FIG. 3, a log data recording part 17 for recording an interactive log is provided in the generally used IVR system 1.

A log obtaining part 27 for obtaining a speech log and the like stored in the log data recording part 17 in the IVR system 1 is added to the grammar update system 2, and the speech newly-recognizing part 21 newly recognizes the obtained speech log.

The log obtaining part 27 obtains speech data as a speech log, log data representing an interaction state and a circumstance, and information on a recognition result in the speech recognizing part 12, reliability of the recognition result in the speech recognizing part 12, and the like. Furthermore, there is no particular limit to a data structure of log data. An example thereof includes a data structure in which the state of interaction, grammar to be used, an interaction time, a caller No., a user ID, speech data, and the like are organized hierarchically.

Figure 4:
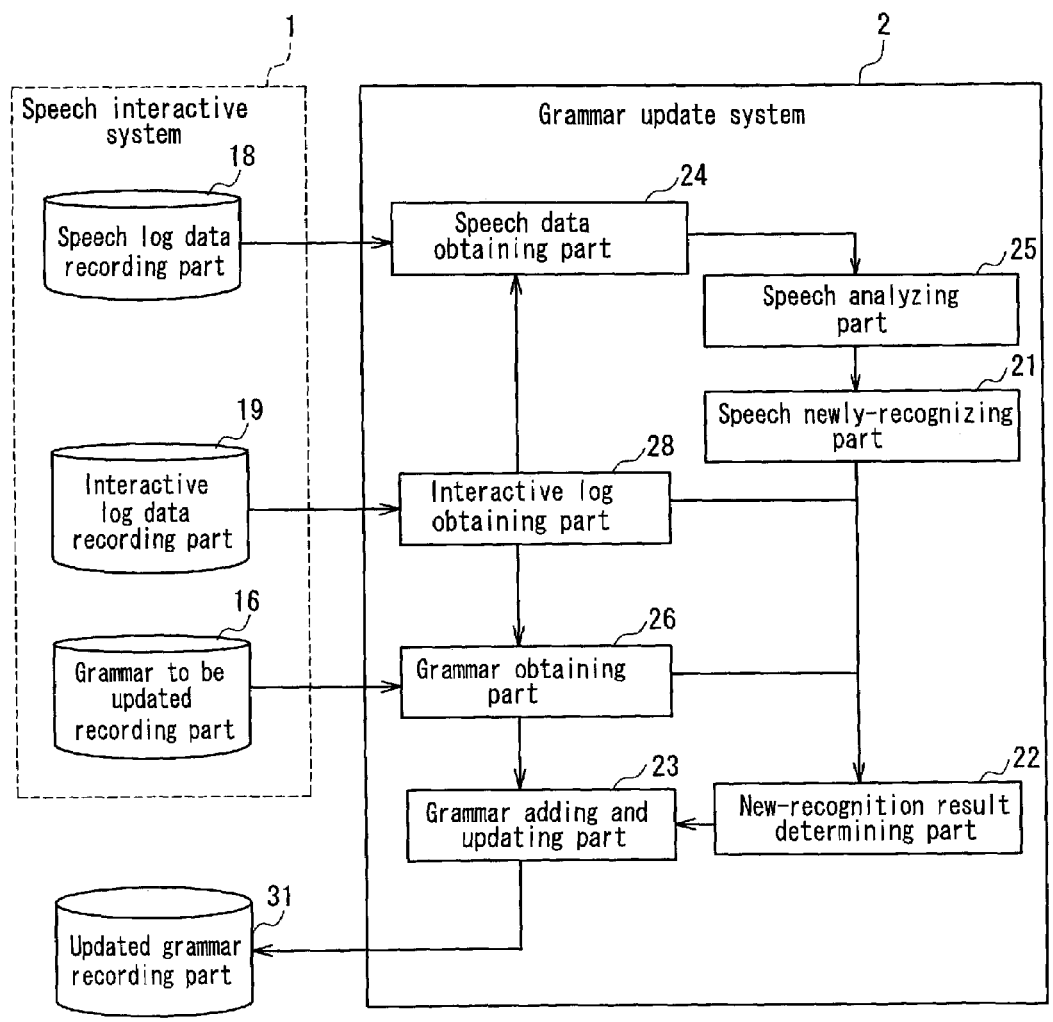
FIG. 4 is a diagram illustrating a configuration of a grammar update system of another example according to the present invention.

More specifically, the following application is considered. FIG. 4 shows a configuration of a grammar update system of another example according to the present invention. In FIG. 4, the case will be described where grammar being used is updated in real time, using a speech log, an interaction state log, and a recognition result log in the IVR system 1.

Referring to FIG. 4, the IVR system 1 includes a speech log data recording part 18 for storing a log of speech data, an interactive log data recording part for storing a log regarding an interaction state, and the grammar to be updated recording part 16 for storing grammar data to be updated.

The interaction log data recording part 19 stores, together with time stamp information, an input speech data ID uttered by a user, a recognition result corresponding to the input speech data ID, a system response, an interaction state (in an interaction scenario), and a grammar ID used at that time. The speech data and the grammar data to be updated, stored respectively in the speech log data recording part 18 and the grammar to be updated recording part 16, are also managed based on the input speech data ID and the grammar ID.

First, in an interaction log obtaining part 28, interaction logs are read in the order of a time sequence by referring to the interaction log data recording part 19, and input speech data IDs are obtained successively. Then, the obtained input speech data ID is given to the speech data obtaining part 24. Simultaneously, a recognition result corresponding to the input speech data ID is extracted to be given to the new-recognition result determining part 22, and the grammar ID used at this time is given to the grammar obtaining part 26.

The speech data obtaining part 24 obtains speech data corresponding to the specified input speech data ID from the speech log data recording part 18 in the IVR system 1 and gives it to the speech analyzing part 25. The speech analyzing part 25 converts the obtained speech data to a feature value suitable for speech recognition by performing acoustic analysis processing such as FFT, and gives the feature value to the speech newly-recognizing part 21. The speech newly-recognizing part 21 recognizes the obtained speech data without using the grammar data and gives the new-recognition result to the new-recognition result determining part 22. The subsequent processing is the same as described above, so that the detailed description thereof will be omitted here.

Furthermore, it is also considered to set restriction matter regarding the update of grammar. The purpose for this is to allow special dialect, the difference between male and female colloquial expressions, and the like to be reflected. For example, in the case where a unique phrase of particular dialect is not set as any restriction matter, a phrase in accordance with the standard language may be accepted using the grammar data, whereas a unique phrase of dialect may not be accepted. In such a case, there is no guarantee that a system manager is always familiar with the special phrase of dialect. Therefore, by previously preparing the special phrase of dialect as restriction matter in the grammar data, it becomes possible to prevent the recognition precision with respect to the special phrase of dialect from decreasing.

Figure 6:
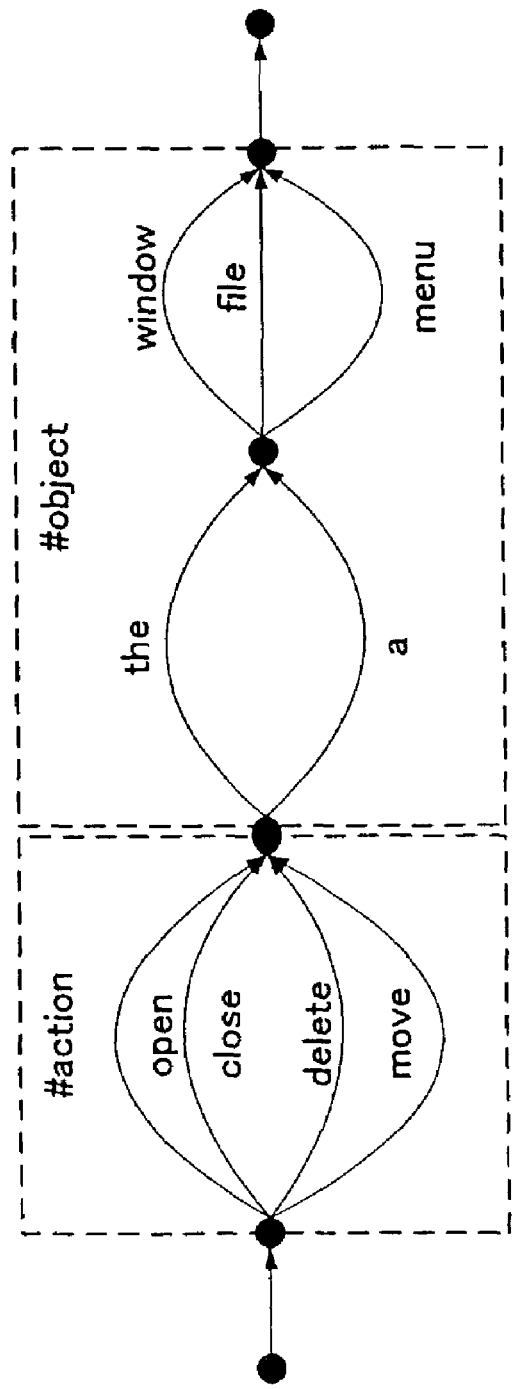
FIG. 6 is a diagram illustrating a sentence structure corresponding to the grammar data in the grammar update system of the embodiment according to the present invention.

FIG. 5 illustrates grammar data stored in the grammar to be updated recording part 16. As shown in FIG. 5, the relationship between '#action' and '#object' is recorded one by one based on an exemplary sentence structure as shown in FIG. 6. According to the method for updating grammar, for example, unrecorded '#action' is added, and a method for connecting an article to a noun in '#object' is newly defined. For example, it is considered to add 'copy' to '#action', and the like.

Furthermore, the reliability of the new-recognition result in the speech newly-recognizing part 21 can be obtained with respect to an update portion of the grammar data. Therefore, a method for determining whether or not the grammar data should be automatically updated in accordance the reliability is also considered. Such reliability can be determined, for example, as follows.

First, speech data for evaluation is prepared, and a new-recognition result is obtained by processing the speech data in the speech newly-recognizing part 21. Then, an evaluation score on the basis of one utterance or one word during use of speech data for evaluation is calculated.

Then, the contents of utterance of the speech data for evaluation are compared with the evaluation score on the basis of one utterance or one word during use of the new-recognition result and the speech data for evaluation to presume a relationship formula of the evaluation score and the correct answer ratio (criterion representing to which degree correct answers are obtained), whereby the reliability of the new-recognition result is obtained. Therefore, the reliability may be obtained with respect to the input entire speech data or on the basis of a word contained in the speech data.

Figure 7:
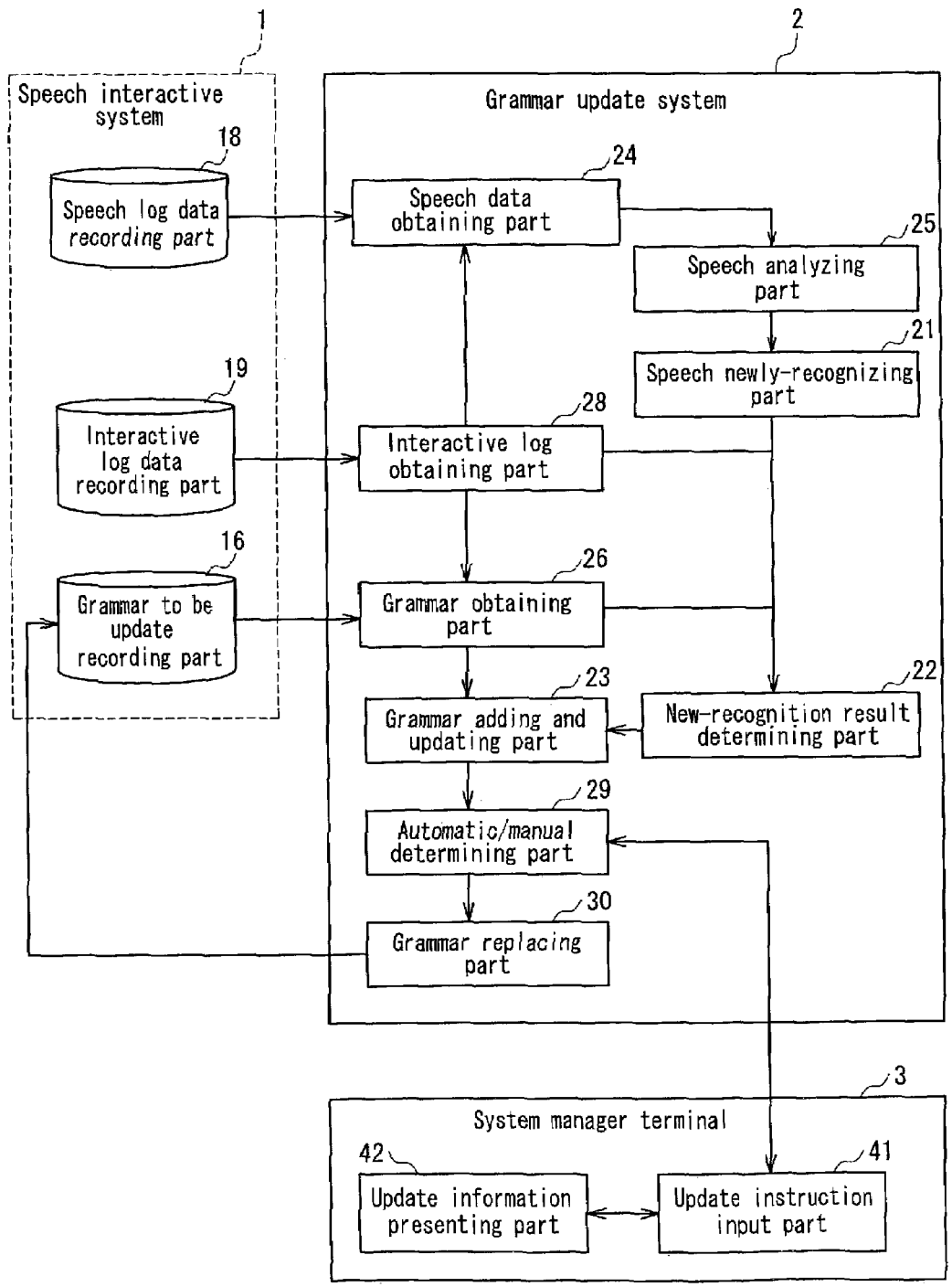
FIG. 7 is a diagram illustrating a configuration of a grammar update system of still another example according to the preset invention.

Furthermore, low reliability means that the new-recognition result in the speech newly-recognizing part 21 is not reliable. Therefore, by determining whether or not the grammar data is updated in accordance with the reliability, the grammar data can be updated with good precision. FIG. 7 shows a configuration of a grammar update system of the present example. Hereinafter, only the difference with respect to FIG. 2 will be described.

In FIG. 7, the speech newly-recognizing part 21 provides reliability to the new-recognition result with respect to the entire result or on the basis of a word and outputs the resultant new-recognition result. Furthermore, in the case where the reliability of the entire new-recognition result in the speech newly-recognizing part 21 is low, even if the new-recognition result cannot be recognized by the grammar to be updated, the new-recognition result determining part 22 sends an instruction signal indicating that it is not necessary to update the grammar data to the grammar adding and updating part 23.

The grammar adding and updating part 23 calculates the reliability of a grammar portion to be updated based on the reliability of a word that has not been matched with the obtained grammar data. Then, the grammar adding and updating part 23 sends an update original grammar ID, updated grammar data, an update portion of the grammar data, and the reliability of the grammar portion to be updated to an automatic/manual determining part 29.

In the case where the reliability of the grammar portion to be updated is equal to or higher than a predetermined threshold value, the automatic/manual determining part 29 sends the update original grammar ID, the updated grammar data, and a replacement order signal to a grammar replacing part 30. In the case where the reliability of the grammar portion to be updated is less than the predetermined threshold value, the automatic/manual determining part 29 sends an update portion of the grammar data and the reliability of the grammar portion to be updated to an update information presenting part 41 of a system manager terminal 3, and is placed in an input stand-by state.

The update information presenting part 41 outputs the received information on a display or the like, receives an input of the system manager from an update instruction input part 42, and sets the contents of the instruction (update/non-update) as a response signal to the automatic/manual determining part 29. In the case where the response signal from the update information presenting part 41 indicates update, the automatic/manual determining part 29 sends an instruction signal for updating the grammar data as well as the updated grammar data to the grammar replacing part 30.

Furthermore, in the grammar replacing part 30 receiving the instruction signal for updating the grammar data, the following configuration is also considered: in the case where it is determined that the grammar to be updated specified by the update original ID is manually replaced by the updated grammar data received together with the instruction signal, speech data based on which the grammar data is updated is sent to the update information presenting part 41, and which contents of utterance is determined not to be recognized to necessitate updating of the grammar data is presented in the update information presenting part 41 together with the grammar update portion. In this case, related information accompanying the speech data can contain personal information on a user. Therefore, the system manager can change setting based on the determination of whether or not the user is member having the right to access the personal information.

Furthermore, in the update information presenting part 41, signals (containing update information and the like) requesting an input by the system manager can be accumulated and processed as a single unit when the system manger accesses the system manger terminal 3.

Furthermore, in the case of a configuration connectable to the network, a mobile phone, a PDA, or the like may be adopted as the system manager terminal 3, and the system manager may be notified of the arrival of an instruction stand-by case via mail or the like.

Furthermore, in the case of an IVR system and the like in which grammar data is discriminated on the user basis, a user is considered to be suitable for determining whether or not the grammar data should be updated. In this case, it may also be possible to allow a user to update the grammar data by using a mobile phone or a web page.

In the present embodiment, a method for updating grammar data every time an update portion of grammar data is extracted has been described. However, a method for processing log data as a single unit to detect update portions as a single unit may also be used.

Figure 8:
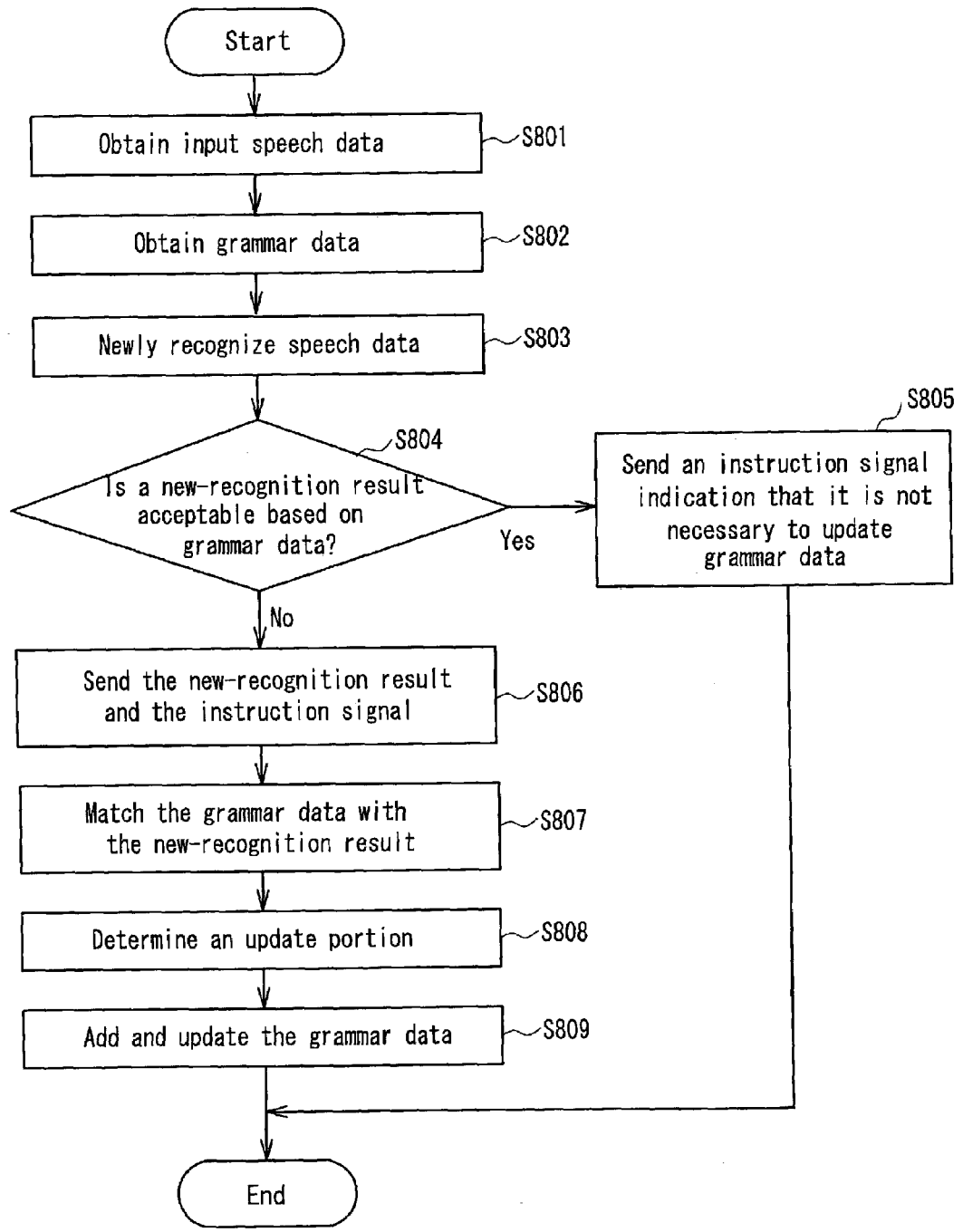
FIG. 8 is a flow diagram illustrating the processing in the grammar update system of the embodiment according to the present invention.

Next, a processing flow of a program for realizing the grammar update system of the embodiment according to the present invention will be described. FIG. 8 shows a flow diagram of the processing of a program for realizing the grammar update system of the embodiment according to the present invention.

In FIG. 8, first, input speech data is successively obtained (Operation 801). Grammar data used for recognizing the obtained input speech data is obtained (Operation 802).

Then, the speech data obtained without using the grammar data is converted to a feature value suitable for speech recognition by acoustic analysis processing such as FFT for new-recognition (Operation 803).

Then, it is determined whether or not the new-recognition result can be accepted based on the obtained grammar data (Operation 804). In the case where it is determined that the new-recognition result can be accepted (Operation 804: Yes), an instruction signal indicating that it is not necessary to update the grammar data is sent (Operation 805). In the case where it is determined that the new-recognition result cannot be accepted (Operation 804: No), the new-recognition result in the speech newly-recognizing part and an instruction signal indicating that the grammar data should be updated are sent (Operation 806).

Finally, only in the case where an instruction signal for updating the grammar data is received, the grammar data obtained based on a grammar ID is matched with the new-recognition result in the speech newly-recognizing part (Operation 807). The unmatched portion is determined to be a grammar update portion (Operation 808). The grammar data is complemented with the update portion to be updated (Operation 809).

Figure 9:
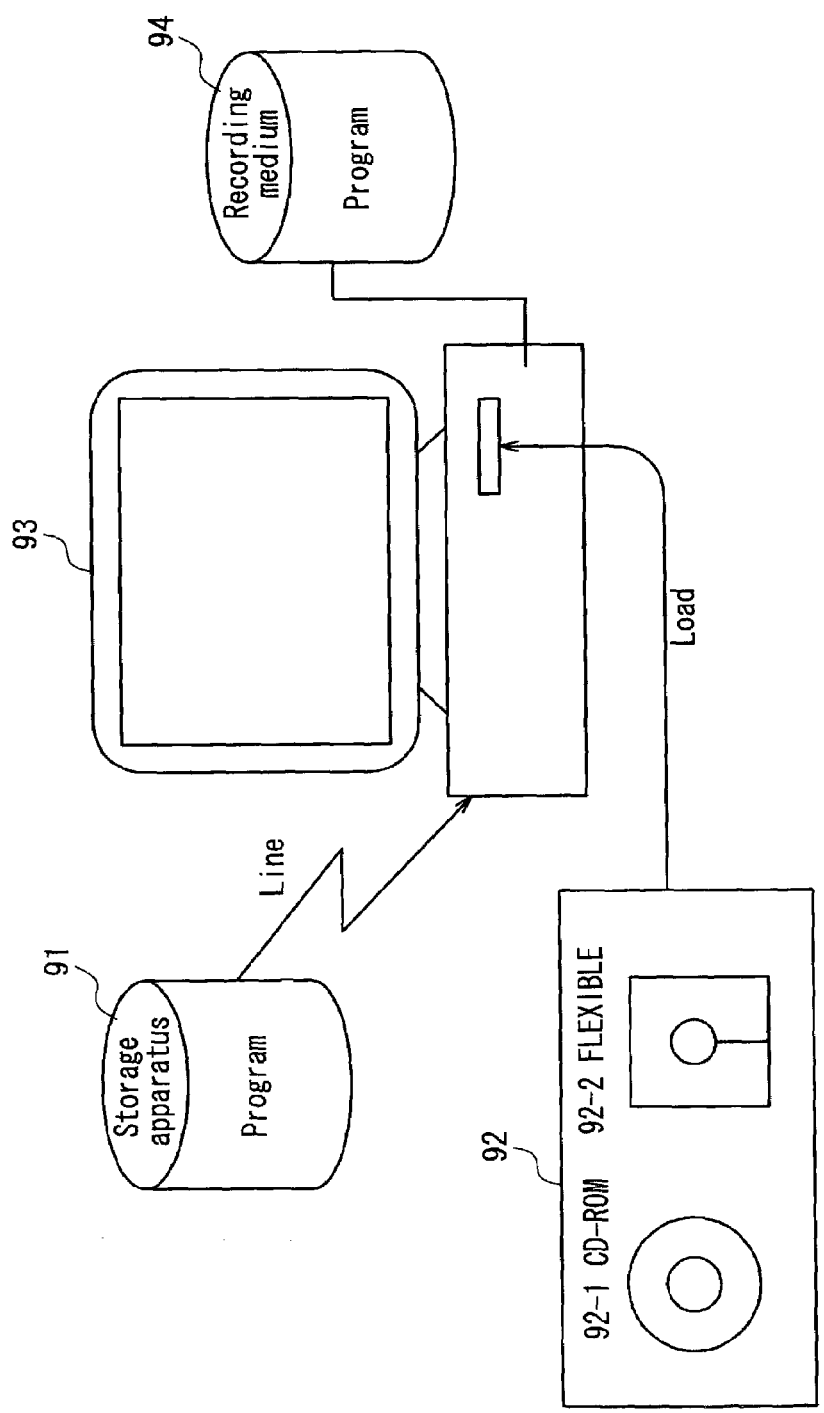
FIG. 9 is a view illustrating a computer environment.

A program for realizing the grammar update system of the embodiment according to the present invention can be stored not only in a portable recording medium 92 such as a CD-ROM 92-1 and a flexible disk 92-2, but also another storage apparatus 91 provided at the end of a communication line and a recording medium 94 such as a hard disk and a RAM of a computer 93, as shown in FIG. 9. In execution, the program is loaded and executed on a main memory.

Furthermore, various log data used by the grammar update system of the embodiment according to the present invention, generated updated grammar data, and the like may be stored not only in a portable recording medium 92 such as a CD-ROM 92-1 and a flexible disk 92-2, but also another storage apparatus 91 provided at the end of a communication line and a recording medium 94 such as a hard disk and a RAM of a computer 93, as shown in FIG. 9. Such data is read by the computer 93 when the grammar update system of the present invention is used.

As described above, according to the present invention, a grammar creation/tuning operation in an IVR system, of which recognition precision has been difficult to enhance while requiring a considerable number of processes in a conventional example, can be executed at an arbitrary timing in accordance with a use situation by a user. Because of this, an IVR system can be configured and operated at a low cost with high performance, and at the same time, high recognition precision to a user can be realized easily.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A grammar update system, comprising:
   an update original grammar recording part storing grammar data used by a speech interaction system that recognizes speech data using the stored grammar data;
   a speech newly-recognizing part newly recognizing the speech data using a dictation system that has a recognition precision which is higher than a recognition precision of the speech interaction system, and has a plurality of vocabularies and a plurality of acceptable sentences, instead of using the stored grammar data;
   a new recognition result determining part determining whether a new recognition result in the speech newly-recognizing part is acceptable using the grammar data; and
   a grammar adding and updating part, when determined that the new recognition result is unacceptable using the grammar data in the new recognition result determining part, specifies such an unaccepted portion as an update portion and adds the update portion to the grammar data stored in the update original grammar recording part.

2. The grammar update system according to claim 1, wherein the grammar adding and updating part is capable of setting restriction matter regarding an update of the grammar data.

3. The grammar update system according to claim 1, comprising:
   an update information presenting part presenting the added and updated grammar data or an update portion in the grammar data; and
   an update instruction input part confirming whether or not an update operation is executed on a basis of the presented update portion of the grammar data.

4. A grammar update system, comprising:
   a log data recording part storing at least speech data and a speech recognition result as log data;
   an update original grammar recording part storing grammar data for speech interaction used for recognizing the speech data;
   a log obtaining part obtaining the speech data stored in the log data recording part;
   a speech newly-recognizing part newly recognizing the speech data obtained in the log obtaining part using a dictation system including a vocabulary and a plurality of acceptable sentences, without using the stored grammar data;
   a new recognition result determining part determining whether a new recognition result in the speech newly-recognizing part is acceptable using the grammar data; and
   a grammar adding and updating part, when determined that the new recognition result is unacceptable using the grammar data in the new recognition result determining part, matching the grammar data with the new recognition result and updating the grammar data stored in the update original grammar recording part.

5. The grammar update system according to claim 4, wherein the grammar adding and updating part is capable of setting restriction matter regarding an update of the grammar data.

6. The grammar update system according to claim 4, comprising:
   an update information presenting part presenting the added and updated grammar data or an update portion in the grammar data; and
   an update instruction input part confirming whether or not an update operation is executed on a basis of the presented update portion of the grammar data.

7. A grammar update method performed by a grammar update system, comprising:
   the grammar update system storing grammar data used by a speech interaction system that recognizes speech data using the stored grammar data;
   the grammar update system newly recognizing the speech data using a dictation system that has a recognition precision which is higher than a recognition precision of the speech interaction system, and has a plurality of vocabularies and a plurality of acceptable sentences, instead of using the stored grammar data;

the grammar update system determining whether a new recognition result in the newly-recognizing operation is acceptable using the grammar data; and when determined that the new recognition result is unacceptable using the grammar data in the determining operation, the grammar update system specifies such an unaccepted portion as an update portion and adds the update portion to the stored grammar data.

8. A grammar update method performed by a grammar update system comprising:

the grammar update system storing at least speech data and speech recognition result as log data, storing grammar data used by a speech interaction system that recognizes speech data using the stored grammar data, and obtaining the stored speech data;

the grammar update system newly recognizing the obtained speech data using a dictation system that has a recognition precision which is higher than a recognition precision of the speech interaction system, and has a plurality of vocabularies and a plurality of acceptable sentences, instead of using the stored grammar data;

the grammar update system determining whether a new recognition result in the newly-recognizing operation is acceptable using the grammar data; and when determined that the new recognition result is unacceptable using the grammar data in the determining operation, the grammar update system specifies such an unaccepted portion as an update portion and adds the update portion to the stored grammar data.

9. A computer-readable medium storing a computer-executable program for realizing a grammar update method, said program causing a computer to execute:

storing grammar data used by a speech interaction system that recognizes speech data using the stored grammar data;

newly recognizing the speech data using a dictation system that has a recognition precision which is higher than a recognition precision of the speech interaction system, and has a plurality of vocabularies and a plurality of acceptable sentences, instead of using the stored grammar data;

determining whether a new recognition result in the newly-recognizing operation is acceptable using the grammar data; and when determined that the new recognition result is unacceptable using the grammar data in the determining operation, specifies such an unaccepted portion as an update portion and adds the update portion to the stored grammar data.

10. A computer-readable medium storing a computer-executable program for realizing a grammar update method, said program causing a computer to execute:

storing at least speech data and speech recognition result as log data, storing grammar data used by a speech interaction system that recognizes speech data using the stored grammar data, and obtaining the stored speech data;

newly recognizing the obtained speech data using a dictation system that has a recognition precision which is higher than a recognition precision of the speech interaction system, and has a plurality of vocabularies and a plurality of acceptable sentences, instead of using the stored grammar data;

determining whether a new recognition result in the newly-recognizing operation is acceptable using the grammar data; and when determined that the new recognition result is unacceptable using the grammar data in the determining operation, specifies such an unaccepted portion as an update portion and adds the update portion to the stored grammar data.

\* \* \* \* \*

UNITED STATES PATENT AND TRADEMARK OFFICE
CERTIFICATE OF CORRECTION

PATENT NO.      : 7,603,279 B2                                                Page 1 of 1
APPLICATION NO. : 10/347320
DATED           : October 13, 2009
INVENTOR(S)     : Nobuyuki Washio It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1289 days.

Signed and Sealed this

Fifth Day of October, 2010

David J. Kappos
*Director of the United States Patent and Trademark Office*